Feb. 12, 1929.  
W. P. BEATTIE  
1,701,743  
CONTROL MECHANISM FOR CENTRIFUGAL EXTRACTORS  
Filed Nov. 25, 1921  2 Sheets-Sheet 1

INVENTOR  
William P. Beattie  
BY Brockett & Hyde  
ATTORNEYS.

Patented Feb. 12, 1929.

1,701,743

UNITED STATES PATENT OFFICE.

WILLIAM P. BEATTIE, OF NORWOOD, OHIO, ASSIGNOR TO THE AMERICAN LAUNDRY MACHINERY COMPANY, OF CINCINNATI, OHIO, A CORPORATION OF OHIO.

CONTROL MECHANISM FOR CENTRIFUGAL EXTRACTORS.

Application filed November 25, 1921. Serial No. 517,749.

This invention relates to improvements in centrifugal extractors.

The objects of this invention are to provide a centrifugal extractor with a series of electric control switches so as to obtain graduated acceleration of the rotating basket during the starting period, and graduated braking during the stopping period; furthermore, to automatically stop the machine, should the rotating basket oscillate beyond a predetermined point, to prevent the starting of the machine with the rotating basket unbalanced beyond a predetermined point, to automatically stop the machine should the cover be opened, and to prevent the starting of the machine with the cover open.

Further objects are to provide means for normal starting and stopping of the machine, to provide means for indicating when the rotating basket reaches safe operating speed, to prevent operation of the cage elevating mechanism until movement of the rotating basket has entirely ceased, to prevent movement of the rotating basket when the cage is elevated, to provide means for the starting and stopping of the elevating mechanism, and to provide means for automatically limiting the raising and lowering movements of the cage.

Other objects will be apparent from the following description and claims when considered together with the accompanying drawings.

Figure 1:
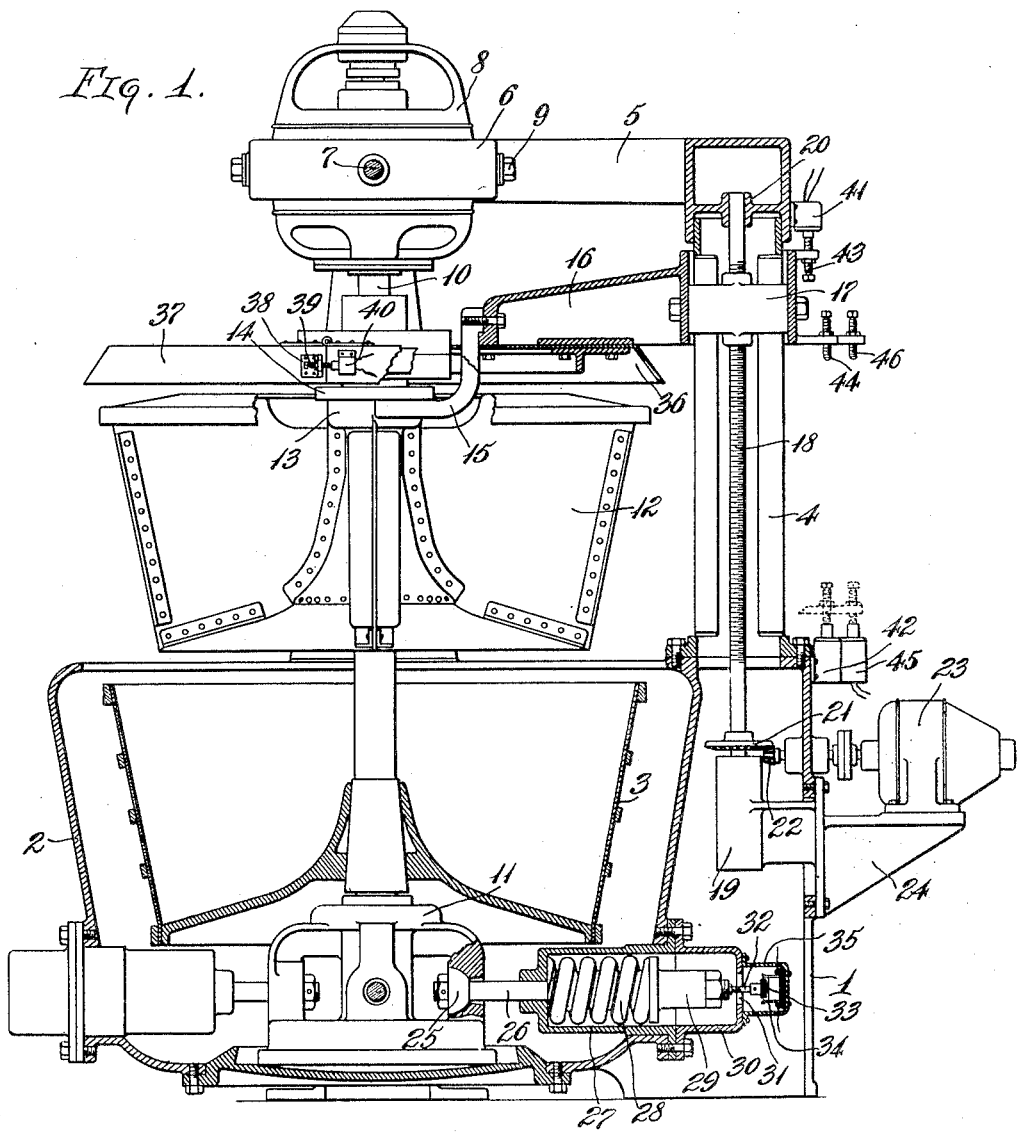
Figure 2:
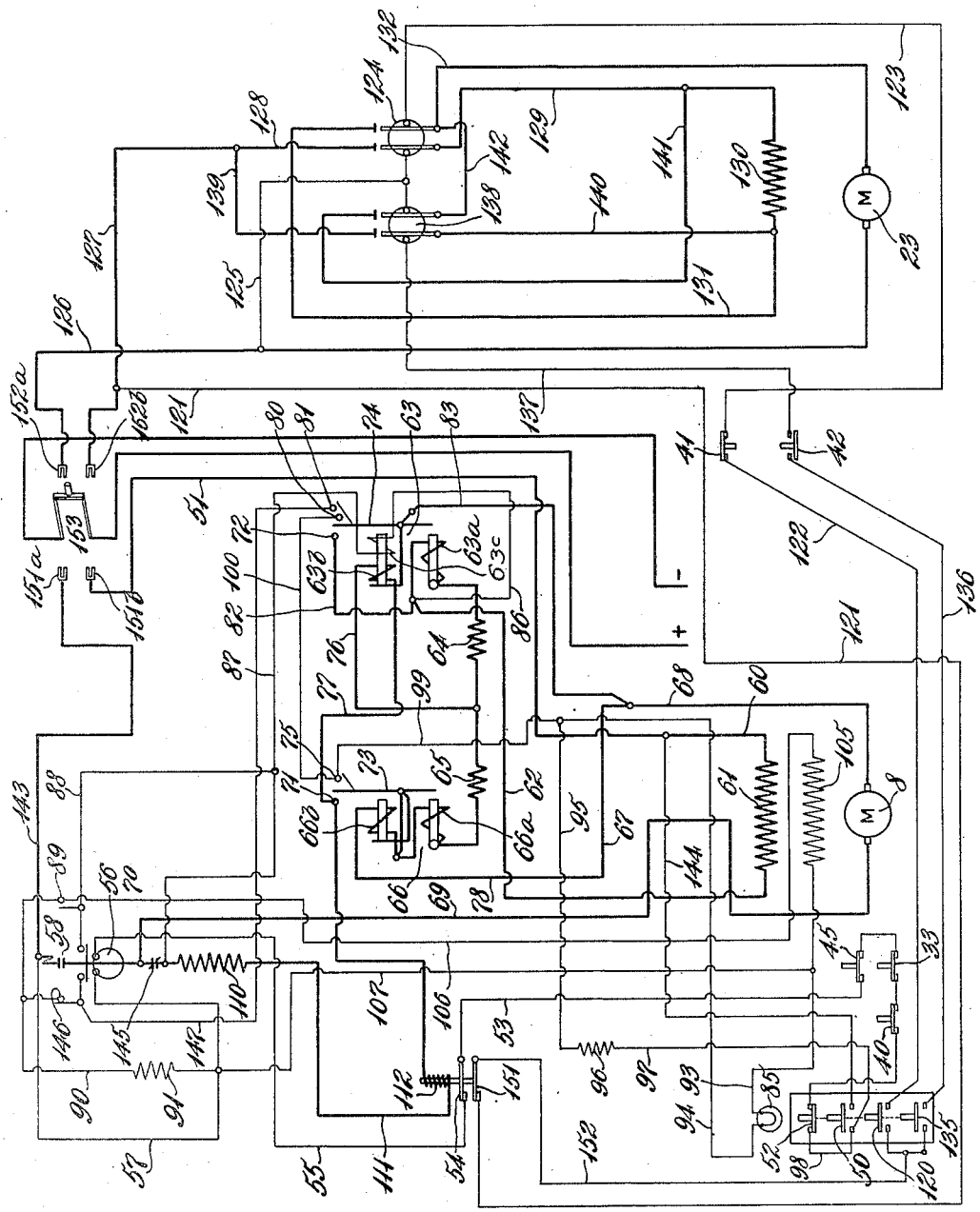

Fig. 1 is a side view of my device partly in elevation and partly in section, showing the cage in raised position; and Fig. 2 is a diagram of the electric control system.

The frame 1 supports the curb 2 within which the basket 3 is rotated and supports also an outstanding column 4 upon which is mounted at its upper end the overhanging bracket 5. The gimbal ring 6 is mounted at 7 in the bracket 5 and the motor 8 for operation of the basket is mounted at 9 in the gimbal ring. The spindle 10, which is driven by the motor 8, supports the basket 3 near its lower end and has bearing at its lower end in the oscillatable bearing 11. The cage or load dividing member 12 is suitably mounted upon the sleeve 13, which is slidable upon the spindle 10 for raising and lowering movement thereupon. The shoulder 14 on the sleeve 13 is engaged for raising and lowering movement by the arm 15, which depends from the bracket 16 carried by the nut 17 on the screw 18. The screw 18 is mounted at its lower end in the bearing 19 and is afforded suitable support at its upper end at the point 20 in the bracket 5. The bevel gear 21 fast on the screw shaft 18 meshes with and is driven by the bevel pinion 22 on the shaft of the motor 23, which affords power for raising and lowering the cage 12. Motor 23 is mounted upon the bracket 24 on the side wall of the casing.

Sockets formed in the walls of bearing 11 are engaged by the ball members indicated at 25 on the inner ends of tension rods 26, which extend into the spring housings 27 enclosing the spiral springs 28. The nuts 29 are provided for regulating the tension of the springs 28 so as to limit the degree of oscillation of the bearing 11 under given conditions. The cover 30 is bolted to the casing 27 and to the wall of the curb 2 and the cover 30 is provided through its outer end with an opening 31 through which extends the rod or stem 32 secured in the outer end of the tension rod 26. Upon the outer end of the rod or stem 32 is provided a contact member 33 for electrical contact engagement with the contact members 34 which are mounted upon the inner wall of the contact cap 35 suitably secured to the end of the cover 30. The contact 34 is normally closed and is opened only when the oscillations of the bearing 11 exceeds that for which the springs 28 have been set. As will later appear, upon breaking the contact 34 the circuit through the motor 8 will be broken and its operation stopped.

The cover 36, for the basket, is provided with a hinged portion 37 upon which is mounted the set screw 38 in the flanged bracket 39. This set screw, which can be adjusted as desired, is so arranged that when the cover 37 is in closed position the contact 40 is held closed so as to maintain closed the circuit through the motor 8. When, however, the cover 37 is raised, the set screw 39 is removed from engagement with the contact 40 so as to cause the circuit through the motor 8 to be opened and the rotation of the basket to be stopped.

Contacts 41 and 42, which are suitably mounted upon the frame 1 and the bracket 5 respectively, are included in the circuit through the motor 23 for raising and lowering the cage 12. Upon operating the motor 23, the cage 12 will move upwardly until the set screw 43, which is suitably mounted upon the bracket 16, engages the contact 41 to open the same and thereby break the circuit through the motor 23 to stop the same. Then upon reversing the motor 23, the cage 12 will be lowered, the contact 41 at once closing as soon as the set screw 43 is moved out of engagement therewith, and the cage 12 will continue to descend until the set screw 44, which is also suitably mounted upon the bracket 16, engages the contact 42 to open the same and thereby stop the motor 23. As soon as the motor 23 is started for raising movement of the cage 12, or in other words, as soon as the set screw 44 leaves contact 42, the contact 42 will automatically close. Contact 45, which is mounted on frame 1, is maintained closed when the cage 12 is within the basket 3 and therefore in operating position, contact being maintained by means of set screw 46. When motor 23 is actuated to elevate cage 12 the circuit of the motor 8 is broken by opening of contact 45, thus preventing the possibility of the cage 12 or basket 3 being rotated with the cage 12 raised. Suitable contacts are provided for manual operation for starting and stopping the motor 8 and also for operating the motor 23 for effecting raising and lowering movement of the cage 12 as will appear from the detailed electric diagram of Fig. 2. The starting and stopping contacts for motor 8 are at 50 and 52 respectively, and the raising and lowering contacts at 120 and 135 respectively.

With double throw line switch 153 closing contacts 151$^a$, 151$^b$, closing the starting contact 50, circuit will be established from the positive side of the main line through wire 51, wire 144, contact 50, wire 98, stop contact 52, which is normally closed, contacts 40, 33 and 45, all of which are normally closed, wire 53, closed contact 54, wire 55, through the coil of double end magnetic contactor 56, and out through wire 57 and wire 143 to the negative side of the main line. Actuation of the magnetic contactor 56 closes contact 58 and opens contact 145 whereupon the following circuit is established through the motor 8: through wire 51 from the positive side of the main line, wire 60, series field 61, wire 62, the coil 63$^a$ of the double end magnetic contactor 63, resistances 64 and 65, both coils 66$^a$ and 66$^b$ of the double end magnetic contactor 66, wire 78, wire 67, wire 68, motor 8, wire 69, armature 70 of contactor 56, contact 58, now closed, through wire 143 to the negative side of the main line. The motor 8 is thereupon set into operation for rotation of the basket 3, the circuit through the motor including the resistances 64 and 65 during the starting period while the current inrush to the motor is high, this circuit being maintained until the current value decreases. This is made possible by the contacts 71 and 72 being maintained open due to the armatures 73 and 74 being held in neutral position by the coils 66$^a$ and 63$^a$, respectively. When, however, the magnetic influence of the coil 66$^b$ overbalances that of 66$^a$, the armature 73 will be attracted by coil 66$^b$ so as to close contact 71 as well as the auxiliary contact 75. The electric control system here shown is so constructed and arranged that contact 71 will first be closed so as to cut out resistance 65, whereupon the following circuit is established: from the positive side of the main line through wire 51, wire 60, series field 61, wire 62, coil 63$^a$, resistance 64, wire 76, coil 63$^b$, wire 77, through contact 71 and armature 73, coil 66$^b$, wire 78, wire 67, wire 68, motor 8, wire 69, armature 70, through closed contact 58 and out to the negative side of the main line through wire 143. Then later, as the current inrush to the motor decreases further, the armature 74 will be caused through the influence of coil 63$^b$ to close contact 72 and also auxiliary contacts 80 and 81, whereby the resistance 64 is eliminated from the circuit through the motor. This circuit is then from the positive side of the main line through wire 51, wire 60, series field 61, wire 62, wire 82, through closed contact 72 and the armature 74, wire 83, wire 68, motor 8, wire 69, through closed contact 58 and out to the negative side of the main line through wire 143. Thus it will be seen that the resistances 65 and 64 are cut out one at a time and in a predetermined sequence which means a two step acceleration of the motor. The shunt field circuit for the motor is from the positive side of the line through wire 51, through wire 60, through series field 61, through wire 62, through wire 86, through coil 63$^c$ of contactor 63, through wire 87, through wire 88, through contact 89, which is closed by the closing of contactor 56, through wire 106, through shunt field 105, through wire 107, through wire 57, through wire 143, to the negative side of the main line.

If the operator should remove pressure from the starting switch contact 50 before resistors 64 and 65 have been cut out by the closing of contactors 63 and 66, the closing coil of contactor 56 would be deenergized, breaking the circuit at contact 58 and the machine would stop. Therefore, pressure must be maintained on the starting switch contact 50 until contactors 63 and 66 close.

Closing of contactors 63 and 66 establish a holding circuit through the coil of contactor 56, maintaining contact 58 closed until any one of the switches, contacts 50, 40, 33 or 45 is actuated; this holding or maintaining circuit being from the positive side of the main line, through wire 51, through wire 60, through series field 61, through wire 62, wire 82, to contact 72, through armature 74, and auxiliary contact 80, through wire 100, to contact 75, through wire 99, through wire 95, through resistance 96, through wire 97, through wire 98, through stopping switch 52, through cover switch 40, through bearing switch 33, through interlock switch 45, wire 53, through closed contact 54, through wire 55, through coil 56, through wire 57, through wire 143, and to the negative side of the main line. The purpose of resistor 96 is to limit potential in coil 56 to proper value for continued service.

Closing contactors 63 and 66 establishes at the same time a circuit through signal lamp 85, which lamp is for the purpose of indicating to the operator that the basket has reached a proper operating speed and that therefore pressure can be removed from starting button 50; thereby insuring that the basket 3 is evenly loaded before being left by the operator. The circuit through the lamp 85 is from the positive side of the main line, through wire 51, through wire 60, through series field 61, through wire 62, through wire 82, to contact 72, through armature 74 and contact 80, to wire 100, to contact 75, through wire 99, through wire 94, through lamp 85, through wire 93, through wire 107, through wire 57, through wire 143, to the negative side of the main line.

Normal stopping of the machine is effected through stop switch 52, pressure on which breaks the maintaining circuit through coil 56, opening contact 58 which in turn discontinues the circuit through the motor from the main line. The opening of double end magnetic contactor 56 closes contact 145 and the motor will function as a short circuited generator until completion of graduated dynamic braking, the initial step of which takes place through the following circuit: from motor 8, through wire 69, through closed contact 145, through brake resistance 110, wire 111, through coil 112, to contact 71 now open, through wire 77, through coil 63$^b$, through wire 76, through resistance 65, through coil 66$^a$, through coil 66$^b$, through wire 78, wire 67, through wire 68, to the other side of the motor 8. The braking is graduated and uses two steps of resistance, namely, brake resistance 110 and starting resistance 65. Immediately after contact 58 is broken by pressure on stop switch contact 52, or through any of the other stop contacts, the high current induced in the circuit causes coil 66$^a$ to overbalance coil 66$^b$, opening contact 71 of armature 73, which inserts resistance 65 in the circuit additional to brake resistance 110, referred to in the circuit outlined above. As the current decreases the magnetic influence of coil 66$^b$ overcomes coil 66$^a$ and contact 71 of armature 73 is again closed, establishing final braking circuit as follows: from motor 8, through wire 69, through closed contact 145, through brake resistor 110, through wire 111, coil 112, wire 149, contact 71, armature 73, coil 66$^b$, wire 78, wire 67, wire 68, to motor 8. Armature 74 of contactor 63 is maintained in contact at 72, through influence of coil 63$^b$ which is energized as described in the foregoing circuit.

The motor field is maintained during the braking period through the circuit from the positive side of the main line, through wire 51, through wire 60, through series field 61, through wire 62, through wire 82, through contact 72, armature 74, auxiliary contact 81, wire 147, through contact 146, now closed, wire 90, to contact 89, wire 106, through shunt field 105, through wire 107, through wire 57, through wire 143, to the negative side of the main line. Resistor 91, being of greater ohmic value than the resistance of the field, prevents by-passing of motor field through circuit wire 90, to wire 57. During the braking period the circuit through coil 112 maintains contacts 54 and 151 open, which prevents the motor 8 being re-started until dynamic braking has been completed and movement of the rotating basket ceases. When movement of the basket has ceased, coil 112 is de-energized, closing contact 54 and re-establishing conditions permitting the re-starting of the machine through actuation of starting switch contact 52. The opening of normally closed contact 151 through the energizing of coil 112 prevents the energizing of either raising or lowering contactors 138 and 124 and therefore insures that movement of the rotating basket 3 will have entirely ceased before motor 23 governing the raising and lowering of cage 12 can be started. On completion of the dynamic braking, this contact 151 due to the de-energizing of coil 112 is normally closed.

When it is desired to raise the cage 12, the operator will first transfer line switch 153 to close contacts 152$^a$, 152$^b$, after which pressure on switch 120 will establish circuit from the positive side of the main line through wire 121, closed contact 151, wire 152, closed contact 120, wire 122, through upper limit switch 41, which is closed, through wire 123, double pole magnetic contactor 124, wire 125, and out through wire 126 to the negative side of the main line. The following circuit is thereby established through motor 23: from the positive side of the main line, through wire 127, wire 128, through one of the poles of the magnetic contactor 124, wire 129, series field 130, wire 131, through the other pole of the contactor 124, wire 132, through motor 23 and out through wire 126 to the negative side of the main line.

The raising movement of the cage will continue, unless sooner stopped by opening the contact 120, until the upper limit switch 41 is automatically opened in the manner above described; at which time the circuit through the contactor 124 will be broken and the circuit through the motor 23 discontinued. Then when it is desired to lower the cage, the operator will close the switch 135, thereby establishing the following circuit; from the positive side of the main line through wire 121, closed contact 151, wire 152, closed contact 135, wire 136, lower limit switch 42, which is now closed, wire 137, through the double pole magnetic contactor 138, wire 125, and wire 126, to the negative side of the main line. The following circuit is thereby established through the motor 23 for the reversing or lower operation: from the positive side of the main line through wire 127, wire 139, through one pole of the contactor 138, wire 140, series field 130, wire 141, through the other pole of the contactor 138, wires 142 and 132, through the motor 23 and out to the negative side of the main line through wire 126. The reverse operation of the motor will continue until the lower limit switch 42 is automatically opened, as above described, whereupon the circuit through the contactor 138 is broken as also the circuit through the motor 23. As above explained, as soon as the cage begins to lower, contact is again made at the upper limit switch 41.

The double throw line switch 153, by insuring that the main motor circuits are disconnected during the raising and lowering of the cage, prevents rotation of the basket when the cage is in other than correct position, i. e., within the machine curb. As the cage is elevated from within the basket, contact 45 is broken, preventing the possibility of energizing the coil of contactor 56, and insuring that the main motor cannot be started with the cage removed from the rotating basket irrespective of on which side the line switch 153 is closed. The double pole, double throw switch 153 also has the purpose of at all times preventing simultaneous operation of the basket rotating motor 8 and cage elevating and lowering motor 23. This switch is movable to two positions, in one of which the basket rotating motor 8 may be made effective and said motor is so effective during the running operation, but entirely throughout the running operation and at all times when motor 8 is rotating the basket the source of current supply to the motor 23 is interrupted at switch 153 and the cage can be neither raised nor lowered. Likewise in the second position of switch 153 the motor 23 may be made effective or operative, but in this position of the switch the supply of current to motor 8 is entirely cut off and the basket cannot be rotated at any time when it is possible to raise or lower the cage.

As a result of the foregoing the loaded extractor may be set into operation by manipulation of starting switch 50, the motor building up its speed until the maintaining circuit is established, as indicated by the running light 85. During acceleration and through the extracting operation the cage cannot be raised or lowered. If motor 8 is stopped, either by operation of the stop button 52 or by throwing the switch 153, to in either case de-energize coil 58, dynamic braking begins. During the dynamic braking period coil 112 prevents effective operation of the cage controlling switches 120, 135, even though the switch 153 is thrown to its extreme right position in Fig. 2. However, when dynamic braking is accomplished, switches 120, 135 are immediately rendered effective.

What I claim is:

1. In combination with a centrifugal extractor having a rotatable cage, two electric motors, one for rotating and the other for elevating the cage, and means for rendering the cage rotating motor ineffective when the cage elevating motor is operating.

2. In combination with a centrifugal extractor having a rotatable basket and a cage in said basket, basket rotating means, means for elevating said cage, means for producing a braking effect upon said basket, and means controlled by said braking means for rendering said cage elevating means ineffective when said basket is rotating.

3. A centrifugal extractor, comprising a rotatable basket, a vertically movable member associated with said basket, two motors, circuits therefor, and a controller for said basket and movable member, said controller being movable to either of two positions in one of which it closes one motor circuit and opens the other to operate said basket and in the other of which it closes the other motor circuit and opens the first to operate said movable member, whereby said vertically movable member cannot be moved while the basket is rotating.

4. A centrifugal extractor, comprising a rotatable basket, an electric motor for operating the same, a vertically movable member associated with said basket, operating means therefor, a controller for said operating means, means adapted when operated to change the circuit connections to said motor and thereby produce a braking effect thereon, and means adapted to prevent effectiveness of said controller pending desirable reduction in speed of the basket rotating motor by said braking means.

5. A centrifugal extractor, comprising a rotatable basket, an electric drive motor therefor, a vertically movable member associated with the basket, an operating motor therefor, controlling means for said motors arranged to selectively cause operation of either, means for producing a braking effect upon said drive motor, and means controlled thereby for preventing effectiveness of said control means upon the second named motor pending desirable reduction of speed of the basket by said braking means.

6. A centrifugal extractor, comprising a rotatable basket, operating means therefor, braking means therefor, a vertically movable member associated with the basket, elevating means therefor, and means controlled by said braking means and effective to prevent operation of said elevating means pending desirable reduction in speed of the basket by said braking means.

7. A centrifugal extractor, comprising a rotatable basket, an electric drive motor therefor, a vertically movable member associated with the basket, an elevating motor therefor, switch means for selectively producing operation of either motor, means for changing the circuit connections to said drive motor to produce a braking effect, and means controlled thereby for rendering said switch means ineffective upon the elevating motor until the basket has come to rest.

8. A centrifugal extractor, comprising a rotatable basket, an electric drive motor therefor, a vertically movable member associated with the basket, an elevating motor therefor, switch means for selectively producing rotation of said elevating motor in either direction, switch means for selectively producing operation of either motor, means for producing a braking effect upon the basket, and means controlled thereby for rendering both of said switch means ineffective upon the elevating motor until the basket has come to rest.

9. A centrifugal extractor, comprising a rotatable basket, an electric drive motor therefor, a vertically movable member associated with the basket, an elevating motor therefor, switch means for selectively producing rotation of said elevating motor in either direction, switch means for selectively producing operation of either motor, means for changing the circuit connections to said driving motor to produce a braking effect, and means controlled thereby for rendering both of said switch means ineffective upon the elevating motor until the basket has come to rest.

In testimony whereof I hereby affix my signature.

WILLIAM P. BEATTIE.